United States Patent [19]

Steenwyk et al.

[11] Patent Number: 5,742,069
[45] Date of Patent: Apr. 21, 1998

[54] DIGITALLY FILTERED LASER RECEIVER

[75] Inventors: Timothy E. Steenwyk, Grand Rapids; Ross C. Stoepker, Kentwood, both of Mich.

[73] Assignee: Laser Alignment, Inc., Grand Rapids, Mich.

[21] Appl. No.: 619,926

[22] Filed: Mar. 20, 1996

[51] Int. Cl.$^6$ .................................................. G01N 21/86
[52] U.S. Cl. .............................. 250/559.29; 250/559.38; 356/4.08
[58] Field of Search ......................... 250/559.3, 559.29, 250/559.38, 208.2; 356/4.08, 141.3, 141.4, 28.1, 11, 373, 375

[56] References Cited

U.S. PATENT DOCUMENTS

| | | |
|---|---|---|
| 3,681,608 | 8/1972 | Derderian et al. |
| 3,729,633 | 4/1973 | Eros et al. |
| 3,788,743 | 1/1974 | George .................................. 356/28 |
| 4,164,650 | 8/1979 | Blackburn et al. |
| 4,693,598 | 9/1987 | Sehr .................................... 356/4.08 |
| 4,717,828 | 1/1988 | Liu ..................................... 356/318 |
| 4,732,471 | 3/1988 | Cain et al. .............................. 356/152 |
| 4,820,041 | 4/1989 | Davidson et al. ...................... 356/4.08 |
| 4,876,444 | 10/1989 | Field ................................... 250/214 AL |
| 5,047,620 | 9/1991 | Durvasula et al. ..................... 250/226 |
| 5,060,085 | 10/1991 | Gelbwachs ............................. 359/160 |
| 5,260,563 | 11/1993 | Hunter et al. ......................... 250/214 A |
| 5,298,738 | 3/1994 | Gebert et al. ......................... 250/222.1 |
| 5,311,369 | 5/1994 | Gelbwachs ............................. 359/886 |
| 5,375,663 | 12/1994 | Teach ................................... 356/375 |

*Primary Examiner*—Que Le
*Attorney, Agent, or Firm*—Van Dyke, Gardner, Linn & Burkhart, LLP

[57] ABSTRACT

A digitally filtered laser receiver includes a plurality of radiation sensors spacially arranged in a manner which identifies a relative position of the sensors with respect to a rotating laser radiation source. The digitally filtered laser receiver includes a microcomputer having inputs which are responsive to impingement of the sensors by radiation. The microcomputer is programmed to process data from the inputs only when the radiation sensors are impinged by radiation from the rotating laser radiation source. The microcomputer processes the data and provides an output which is indicative of the position of the rotating laser radiation source and the sensors.

28 Claims, 7 Drawing Sheets

5,742,069

DIGITALLY FILTERED LASER RECEIVER

BACKGROUND OF THE INVENTION

The invention relates to laser receivers and, more particularly, to laser receivers which identify a relative position of a plurality of spatially arranged sensors and radiation from a rotating laser beacon. The invention has application primarily in the construction industry for both manual use in providing a visual indication to an operator of the position of the receiver with respect to a rotating laser and in automatic control of construction equipment by supplying an output to an automatic control system. Such automatic control systems may control the height of a dozer or grader blade, position of an excavator bucket, height of a paver screed, and the like.

Laser receivers typically include a plurality of radiation sensors, which are spatially arranged, typically aligned in a vertical column, and which respond to impingement by a radiation source. Impingement of one or more radiation sensors by a rotating laser results in an output indicating which one of the radiation sensors was found to be at the center of the laser plane. Such laser receivers may be used manually in order to guide an operator, for example, in erecting a ceiling, establishing concrete forms, laying a floor, or the like. Such laser receivers may also find application in manual machine control, such as the combined verticality and depth indicator disclosed in commonly assigned U.S. Pat. No. 4,884,939 issued to Edward G. Nielsen for a SELF-CONTAINED LASER-ACTIVATED DEPTH SENSOR FOR EXCAVATOR.

Such laser receivers have additionally been utilized in automatic machine control by adjusting the height of a construction implement in response to which sensor, or sensors, are impinged by a rotating laser, in order to center the laser receiver in the rotating laser plane. Such automatic control has been used, for example, to control the height of a blade on a dozer or a grader. Such automatic control may further be utilized to calibrate the location of a bucket on the end of a series of articulated support members which are hydraulically operated. Such excavator control may be of the type disclosed in commonly assigned U.S. Pat. Nos. 4,829,418; 4,866,641; and 4,945,221 for an APPARATUS AND METHOD FOR CONTROLLING A HYDRAULIC EXCAVATOR. Such laser receiver may further be utilized to control the elevation of a screed on a concrete or asphalt paver utilized either in an outdoor environment, for example, to pave roads, or in an indoor environment, for example, to lay a concrete floor in a warehouse or the like.

Such laser receivers, although intended to respond only to the radiation emitted by a rotating laser beacon, may produce false indications in response to other stimuli. For example, the solidstate photoreceptors utilized as radiation receivers may produce a false indication of radiation impingement when subjected to mechanical shock. Such mechanical shock may occur, for example, when a construction implement abruptly makes impingement with a solid object, such as the ground or the like. Another source of false stimuli is a strobe light utilized in many locations on construction equipment, and other vehicles, in order to increase the visibility of the vehicles, especially in inclement weather. Such strobes produce a repetitive burst of radiation which can be interpreted by known laser receivers as a rotating laser beacon.

Other stimuli may also produce false outputs in a laser receiver. Other non-laser-beacon radiation sources which may produce false outputs include electromagnetic interference (EMI), incandescent and fluorescent lights, reflections of a rotating laser off of shiny surfaces such as windows, sunlight modulated by the atmosphere, and the like. Such false indications are undesirable and may be highly detrimental to the proper operation of a construction implement.

SUMMARY OF THE INVENTION

The present invention is intended to overcome the deficiencies in known laser receivers by providing microcomputer processing of the information received from the radiation sensors, or photoreceptors, in a unique manner which filters out false stimuli provided to the laser receiver.

According to an aspect of the invention, a laser receiver is provided having a plurality of radiation sensors, or photoreceptors, which are spatially arranged in a manner which identifies relative position of the sensors and a radiation source as a function of which one, or ones, of the sensors are impinged by the radiation source. The laser receiver further includes a microcomputer having inputs that are responsive to impingement of the radiation sensors by a radiation source. The microcomputer produces output data which is indicative of the relative position of the sensors and a radiation source. The microcomputer is programmed to process input data in a manner which produces this output data only in response to radiation from a rotating laser.

This may be accomplished, according to another aspect of the invention, by recognizing an invalid radiation pattern as a function of the combination of sensors being impinged by a radiation source. An invalid pattern may be ignored or, where possible, corrected to a valid pattern. This may further be accomplished, according to other aspects of the invention, by responding only to radiation which impinges the sensors in a proper time and repetition sequence.

These and other objects, advantages, and features of this invention will become apparent upon review of the following specification in conjunction with the drawings.

DESCRIPTION OF THE PREFERRED EMBODIMENT

Figure 1:
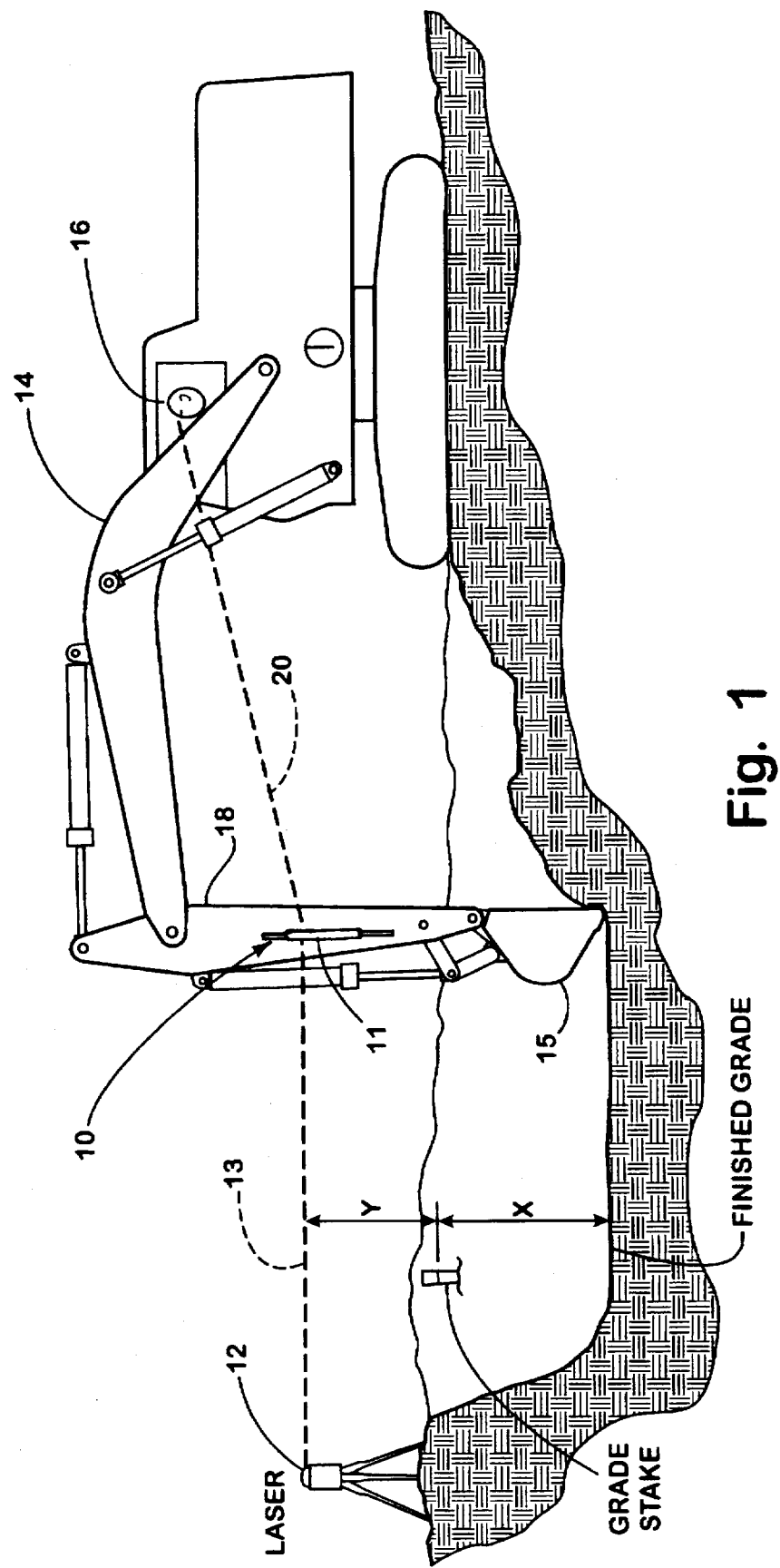
FIG. 1 is a side elevation illustrating a digitally filtered laser receiver, according to the invention, in one particular application.

Referring now to the drawings and illustrative embodiments depicted therein, a digitally filtered laser receiver 11, according to the invention, is illustrated as used in a self-contained laser-activated depth sensor for excavators of the type disclosed in commonly assigned U.S. Pat. No. 4,884,939 issued to Edward G. Nielsen, the disclosure of which is hereby incorporated herein by reference (FIG. 1). Depth sensor 10 responds to radiation 13 produced by a rotating laser beacon 12. Depth sensor 10 is positioned on the stick 18 connected to an excavator cab 16 by a boom 14. Depth sensor 10 responds to the relative position of laser receiver 11 with respect to radiation source 13 and provides an indication 28 to an operator in cab 16 of the relative height of a bucket 15 at the end of stick 18. This allows the operator to measure the depth of the finished grade dug by the excavator by positioning the bucket in the trench. Depth sensor 10 is an example of an application of digitally filtered laser receiver 11 for use in manual construction machine control. It should be understood that a digitally filtered laser receiver according to the invention may additionally be utilized to control all or part of a construction implement, for example, in the manner disclosed in commonly assigned U.S. Pat. Nos. 4,829,418; 4,866,641; and 4,945,221 issued to Nielsen et al., the disclosures of which are hereby incorporated herein by reference as well as dozers, pavers, graders, and the like.

Figure 2:
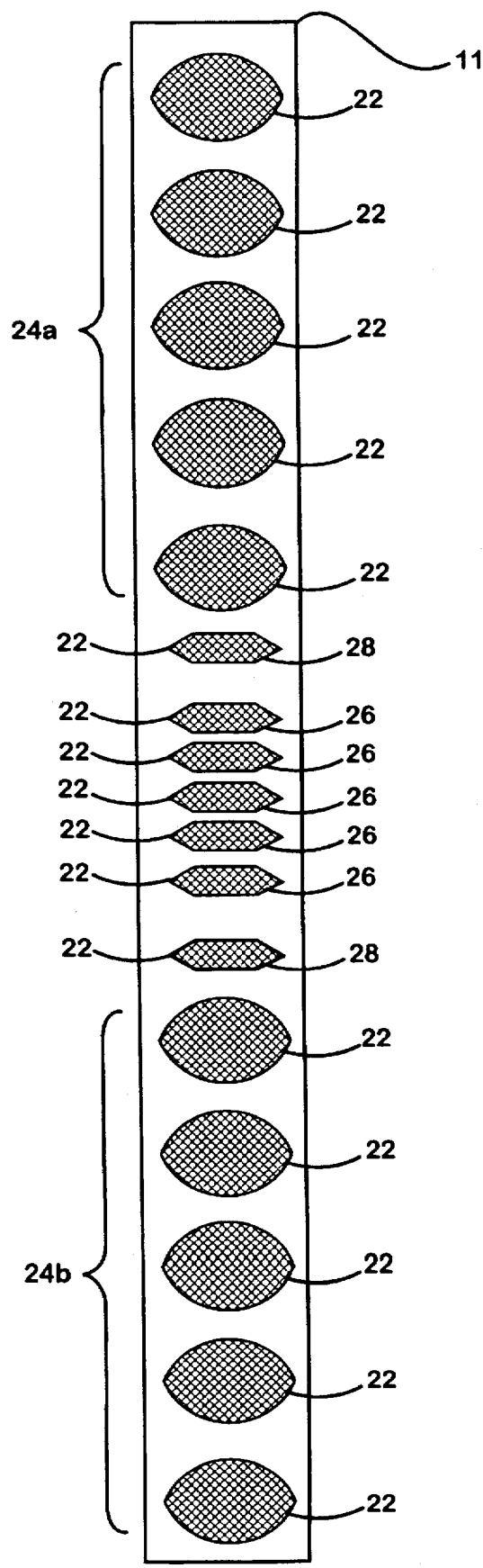
FIG. 2 is a side elevation of a plurality of spatially arranged radiation sensors useful with the invention.

Digitally filtered laser receiver 11 includes a plurality of radiation sensors 22 which are spatially arranged in a manner which is capable of providing a measurement of the relative position of the laser receiver and a source of radiation (FIG. 2). Sensors 22 are spatially arranged linearly along an axis, which is typically perpendicular to the plane of radiation generated by the rotating laser beacon. Although one column of sensors is illustrated in FIG. 2, laser receiver 11 may include more than one column to ensure that the sensors are not shielded from the rotating laser. Sensors 22 may be organized into groups, such as outer groups, or bands, 24a, 24b, which respond together in order to produce an indication of impingement of either outer band 24a or 24b by a radiation source, a plurality of innermost sensors 26, which each responds individually to impingement by a radiation source, and intermediate sensors 28, which are positioned between inner sensors 26 and outer bands 24a, 24b in order to respond to impingement by radiation sources at the respective positions.

Figure 3:
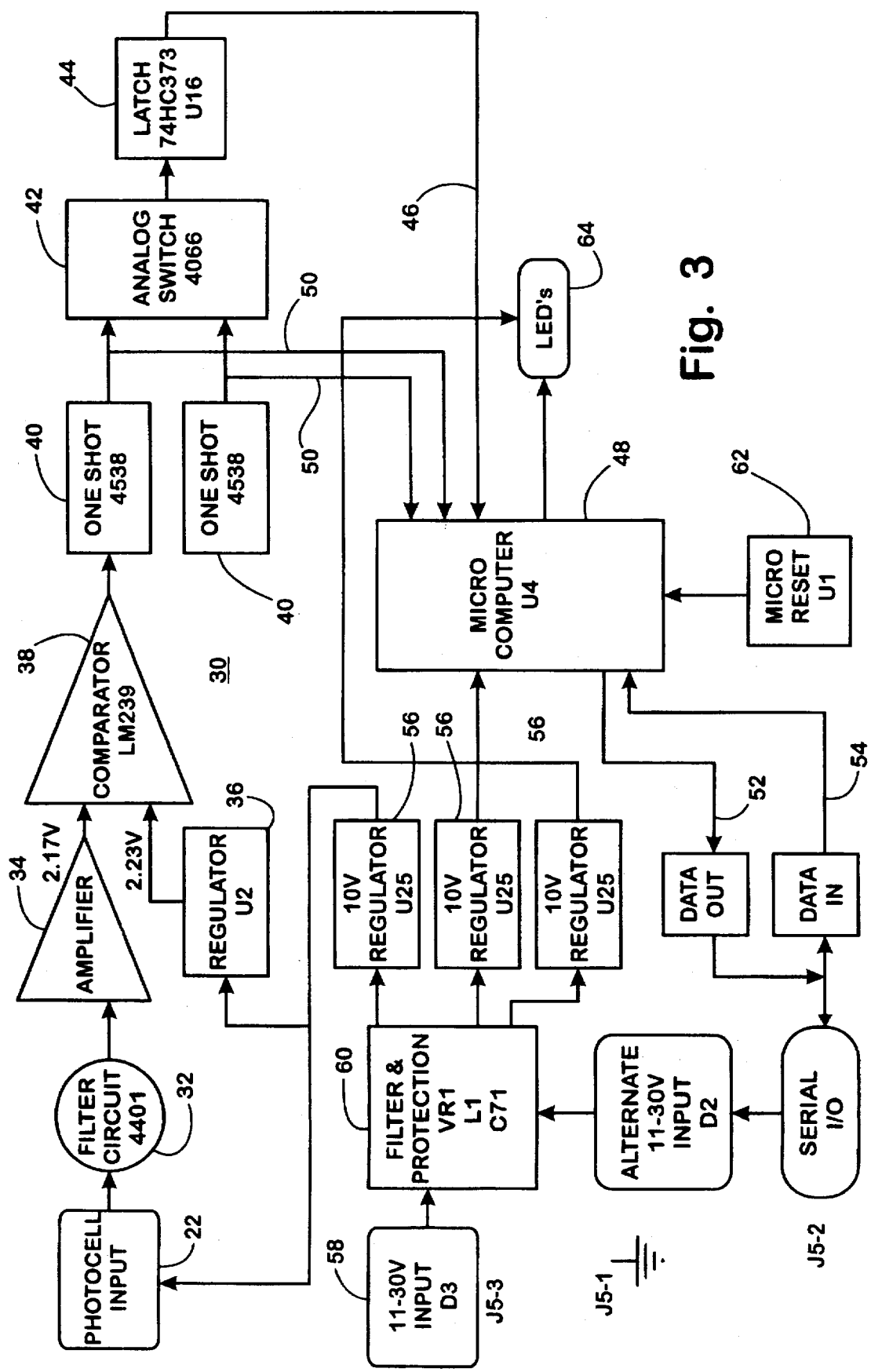
FIG. 3 is an electrical block diagram of a control system, according to the invention.

Digitally filtered laser receiver 11 includes a control circuit 30 (FIG. 3). Each photocell 22 or groups of photocells such as outer bands 24a, 24b are filtered by a filter circuit 32, which is illustrated as an active hardware filter intended to simulate an inductor, in order to shunt DC current, which may be generated by the associated sensor from ambient light, such as sunlight, impinging the associated sensor, to ground while allowing AC current spikes, received from momentary radiation sources, such as a rotating laser, to pass through to the remainder of the circuit. The signal passes from filter circuit 32 to an amplifier 34. Amplifier 34 is a non-inverting amplifier having a gain, in the illustrative embodiment, of 16 at high frequencies and a gain of 1 at low frequencies with a pole at 7.2 kHz. Amplifier 34 attenuates frequencies above approximately 280 kHz. The reason for this amplification characteristic is that the frequency components generated by the envelope of a rotating laser impinging sensor 22 tend to fall within a bandwidth of between approximately 500 Hz and 250 kHz. Amplifier 34, therefore, passes frequencies having the characteristics of a rotating laser while attenuating signals produced by sources other than rotating lasers.

The amplified signal is compared with a reference voltage, produced by a regulator 36, with a comparator 38. The output of comparator 38 is supplied to a monostable multivibrator, or a one-shot. 40, which extends pulses to a fixed period of time, which in the illustrated embodiment is approximately 5 msec. The output of one-shot 40 is supplied along with the one-shot 40 associated with an adjacent sensor 22, or sensor group, to an analog switch 42. Analog switch 42 produces a digital output which indicates which of two adjacent sensor channels was impinged by a radiation source first. The output of analog switch 42 is latched at 44 and supplied as an input 46 to a microcomputer 48. The outputs of one-shots 40 are also supplied as inputs 50 to microcomputer 48. By determining which sensors are receiving radiation, from inputs 50, and which of two adjacent sensors receives radiation first, from input 46, microcomputer 48 is able to determine the sensor 22 from the entire group of sensors 22 which was first impinged by the leading edge of the radiation source. This allows microcomputer 48 to better determine the sensor 22 which lies centermost in the laser plane.

In addition to inputs 46 and 50, microcomputer 48 receives an interrupt signal whenever any sensor 22 is impinged by a radiation source. Microcomputer 48 produces an output 52 indicative of which sensor, or band of sensors, was impinged by the rotating laser. In the illustrated embodiment, output 52 is a serial output which is transmitted following each valid impingement of laser receiver 11 by a laser signal. Following each such transmission, a transmission of control information is received on an input 54 from an operator's panel (not shown). If used in a depth sensor 10, control circuit 30 may produce output indications on groups of light-emitting diodes (LED) 64, as described in detail in the above-mentioned Nielsen patent.

Control circuit 30 receives regulated DC voltage from a series of voltage regulators 56 which, in turn, receive voltage from a power input 58 which is filtered and protected at 60. A monitor circuit 62 monitors the voltage level supplied to control circuit 30 and responds to variations therein by applying a reset pulse to microcomputer 48, if an error condition is found to exist.

Figure 4:
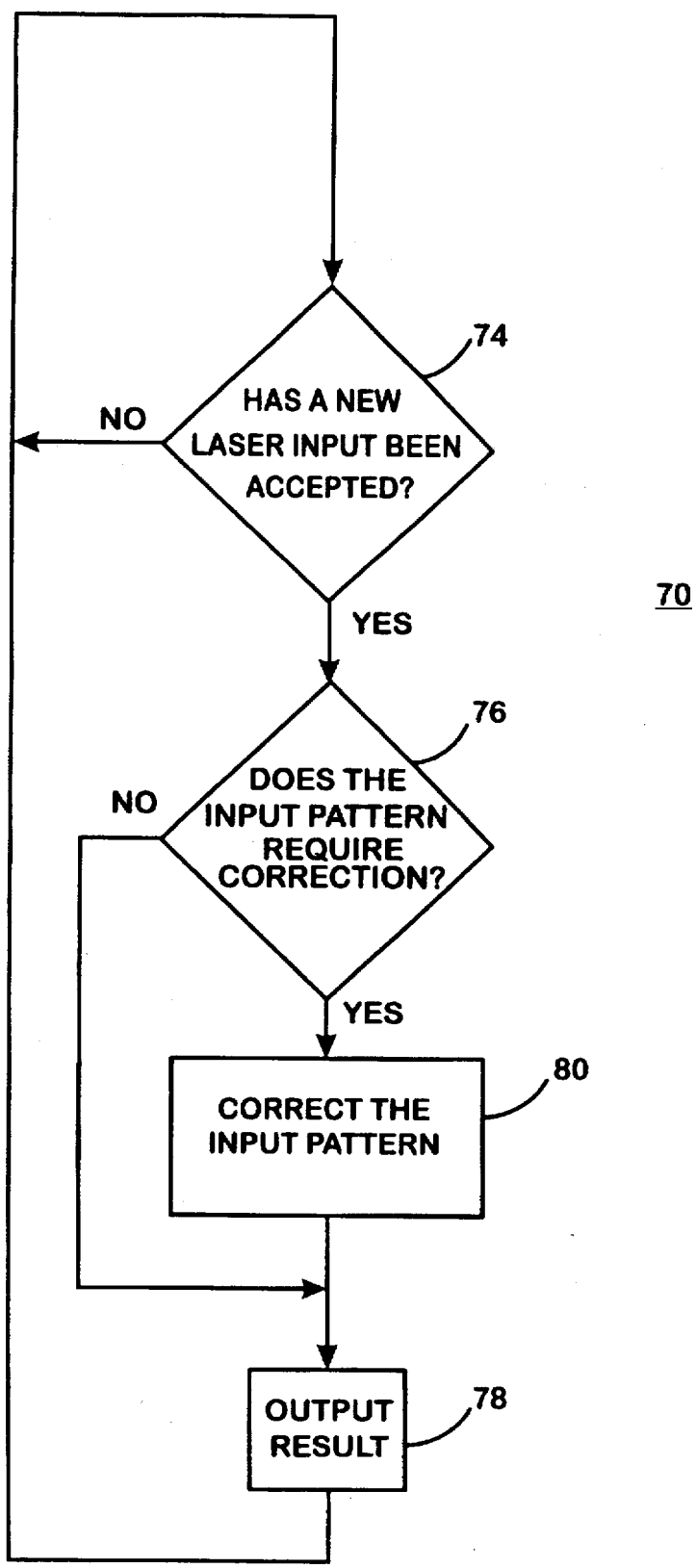
FIG. 4 is a flowchart of a primary control loop of a program, according to the invention.

Microcomputer 48 is operated by a main control program 70 (FIG. 4). Program 70 determines at 74 whether an impingement with the sensors 22 has been accepted in a sensor interrupt routine 84. If not, the routine loops back through decision block 74 until a laser impingement is accepted. If it is determined at 74 that a laser impingement has been accepted. It is then determined at 76 whether the particular combination of sensors 22 impinged by the radiation source is an accepted pattern that requires correction. If it is determined at 76 that an input pattern requiring correction has been accepted, control passes to 80 where an attempt is made to correct the input pattern using a control algorithm. For example, if a number of adjacent sensors 22 are impinged by a radiation source, but one of the adjacent sensors did not become impinged, or did not respond to impingement, by the laser source and that sensor is surrounded by impinged sensors, program 70 will "fill in" the missing sensor reception. If it is determined at 76 that the accepted input pattern does not require correction, or after the correction to the input pattern has been completed at 80, the value of the sensor found to be at the center of the laser plane is outputted at 78 either by energizing a group of LEDs 64 or by providing output data at 52.

Figure 5A:
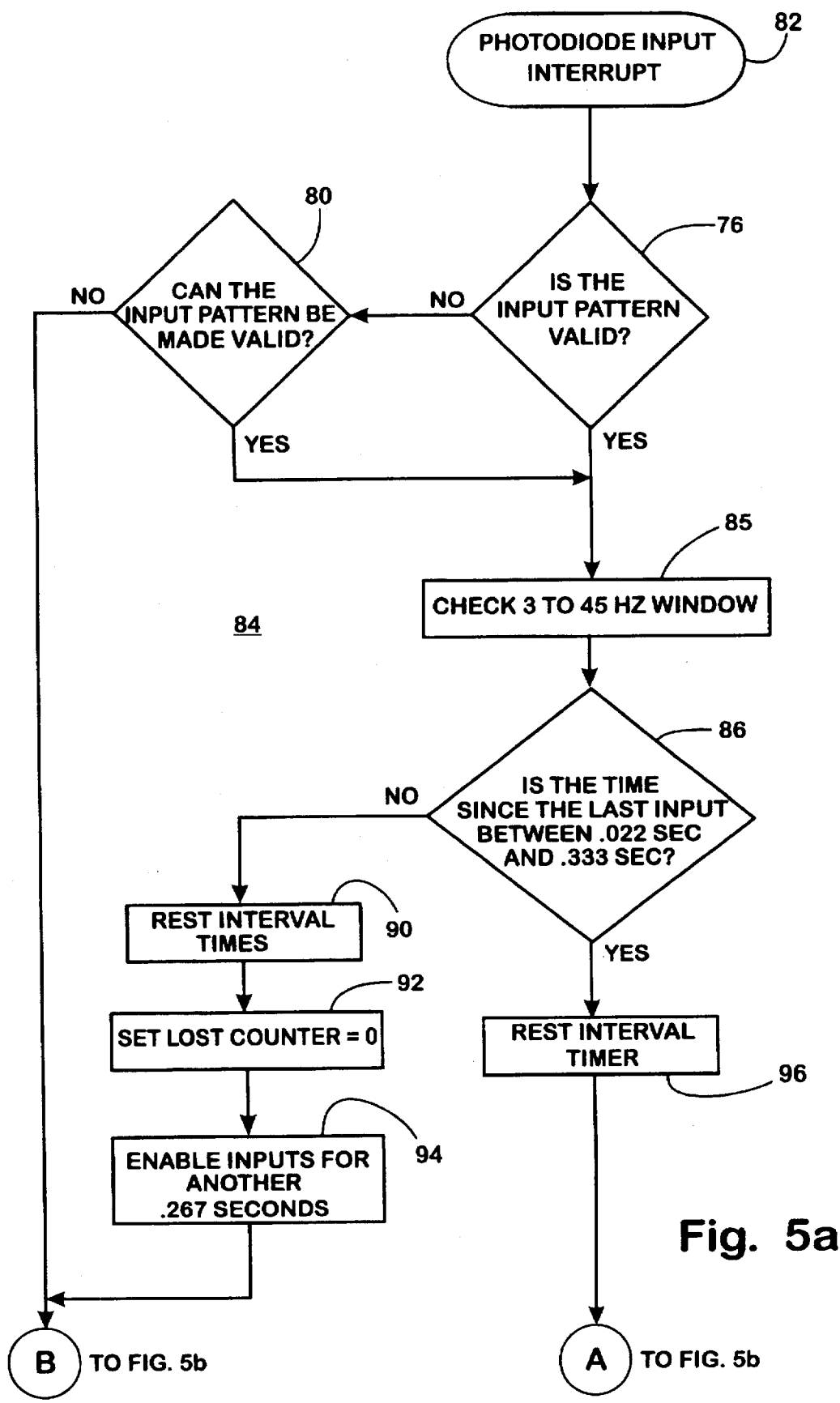
FIGS. 5a and 5b are a flowchart of an interrupt routine of the program, according to the invention, which is initiated in response to impingement by a radiation source.
Figure 5B:
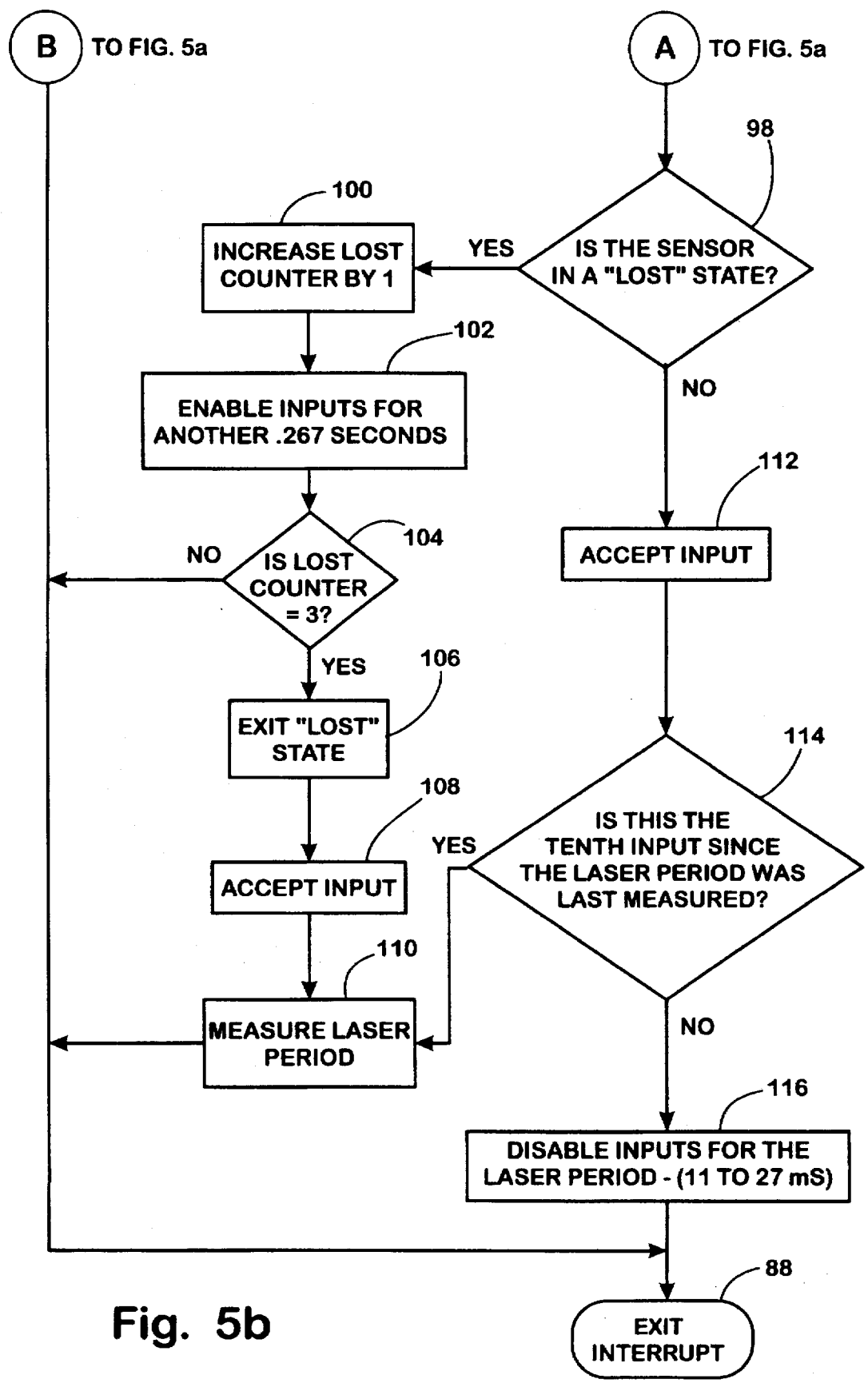
Figure 6:
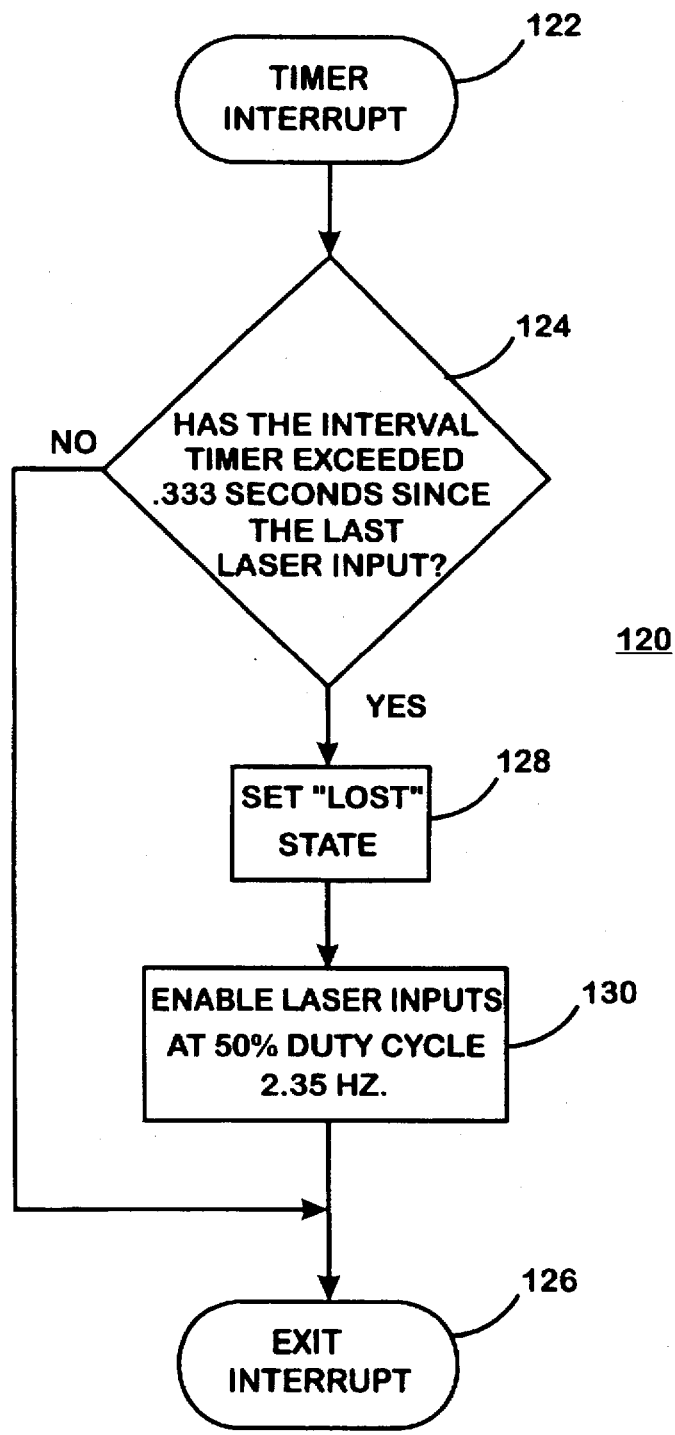
FIG. 6 is a flowchart of an interrupt routine of the program, which is initiated in response to a timer.

When radiation impinges one or more sensors 22, a photodiode input interrupt 82 is generated (FIGS. 5a and 5b). This results in an interruption to main program module 72 and processing of an interrupt routine 84. In response to the photodiode input interrupt 82, it is determined at 77 the input pattern is valid. The purpose of this determination is in order to filter out actuation of laser sensors by radiation sources other than rotating lasers, particularly by a strobe light and non-laser radiation sources such as EMI. and mechanical shock. In the illustrated embodiment, this pattern is defined by the outer bands 24a, 24b on opposite ends of the sensor reception range simultaneously being impinged by a radiation source. Alternatively, a plurality of sensors which are spaced apart sufficiently to indicate a blanketing of the receiver with radiation could be used to reject the impingement as an invalid pattern. In contrast, a rotating laser will impinge a small group of adjacent, or almost adjacent, sensors 22. If it is determined 77 that a valid pattern has been detected, control passes to 86. If the input pattern is not valid, it is then determined at 80 whether the input pattern can be made valid. If the invalid pattern determination resulted from sensors which are widely spaced apart being impinged concurrently by radiation, it is then concluded that the invalid pattern cannot be corrected. When the invalid pattern cannot be corrected, control passes to exit 88. The corresponding inputs are ignored and no change in output is produced by microcomputer 48. Thus, the ability to recognize invalid patterns that cannot be corrected is based upon a discovery that a strobe light or other flashes of light, or mechanical shock, or EMI, will be received by sensors across large areas of the laser receiver. If it is determined at 80 that the pattern can be made valid, control passes to 86.

After it is determined at 77 that the input pattern is valid or at 80 that the invalid input can be made valid, a determination is made at 86 whether the time since the last input corresponds to a pulse repetition rate of between 3 and 45 Hz. This is accomplished by reading an interval timer which is internal to microcomputer 48 to determine whether the time since the last input was between 0.22 sec and 0.333 sec. This repetition rate range was selected to eliminate incandescent and fluorescent light sources which alternate at 60 Hz in particular parts of the world and 50 Hz in other parts of the world and at harmonic frequencies thereof. If it is determined at 86 that the time since the last input did not fall within the prescribed range, the interval input timer is reset at 90 and a "lost" counter is reset to zero at 92. The inputs 46, 50 to computer 48 are enabled at 94 for a given period of time, such as 0.267 sec. The interrupt is then exited at 88.

If it is determined at 86 that the time since the last input falls within the prescribed range, the interval timer is reset at 96. Control then passes to 98 where it is then determined whether the sensor is in a "lost" state. The receiver is in a "lost" state when it is initially impinged by a rotating laser. The receiver remains in the "lost" state until a predetermined number of valid laser strikes are received. While in the "lost" state, the laser receiver does not output any responses to sensed inputs by sensor 22. This is in order to avoid actuation of outputs 52 of the microcomputer 48 upon a spurious signal as may occur, by way of example, when the laser receiver is subject to a mechanical shock, such as a receiver on a construction implement, such as a blade, impinging an object, such as the earth, rock, or the like. If it is determined at 98 that the receiver is in such "lost" state, the input results in an incrementing of a "lost" counter at 100 and enablement of the inputs 46, 50 at 102 for another 0.267 sec. It is then determined at 104 if the "lost" counter is equal to 3. If not, the interrupt routine is exited at 88. If it is determined at 104 that the "lost" counter is equal to 3, the "lost" state is exited at 106 and that input is accepted at 108. The accepted input is processed by main routine 20 in the manner previously described. Microcomputer 48 then measures the period of rotation of the laser beacon at 110 by reading the value of the interval timer. The value in the interval timer represents the interval between the two most previous laser impingements with sensors 22. This information will be utilized in a manner described below.

If it is determined at 98 that the receiver is not in a "lost" state, the input is accepted at 112 and control passes to 114 where it is determined whether a particular number of inputs have been received since the last period when the laser repetition rate has been measured. In the illustrated embodiment, this remeasurement of the laser period occurs every ten inputs. However, this could occur at any number of periods which are determined to be satisfactory for the application. If it is determined at 114 that this input is not the tenth input since the laser period was last measured, control then passes to 116 where the inputs are disabled for a particular period of time related to the repetition rate, or period, of the laser. Microcomputer 48 does not receive any inputs for a period of time corresponding to the period between pulses generated by the rotating laser shortened by a particular amount. This prevents any spurious inputs from being provided to microcomputer 48 until the moment when the next pulse is expected to be received by one or more sensors 22. This may be accomplished by removing the bias to one or more sensors 22 during this blanking period. In addition to avoiding the receipt of spurious inputs, this operation saves power consumption of laser receiver 11. Other of the sensors 22 are blanked by microcomputer 48 ignoring inputs received from such sensors. Alternatively, all of the sensors could be powered down during this period. All of the inputs from the sensors could be ignored, or both. If the repetition rate of the laser beacon is 37 Hz or greater, the blanking period is limited to 13 msec. If the repetition rate of the laser beacon is less than 5 Hz, the inputs are disabled for no more than 213 msec.

This blanking of inputs to microcomputer 48 in between expected reception of the next laser pulse significantly reduces the likelihood that a non-laser radiation source will be validly received by laser receiver 11 or that mechanical shock, EMI, or random spurious actuation of a sensor will create an input. Because the microcomputer is not receiving inputs during the blanking period, it is necessary to occasionally eliminate such blanking period so that the repetition rate, or period, of the laser may be repeatedly measured and tracked. This knowledge of the laser period is a necessary input to routine 116 because the blanking period is a function of the laser repetition rate.

If it is determined at 114 that this input is the tenth input since the laser period was last measured, control passes to 110 where the laser period is measured without disabling the inputs.

A timer interrupt routine 120 is initiated at a preset time. When the timer interrupt is initiated at 122, it is determined at 124 whether the interval timer has exceeded 0.333 sec. The value of the interval timer is the time since receipt of the last valid laser input. If it has been determined at 124 that this time has not been exceeded, the interrupt routine is exited at 126. If it is determined at 124 that this time period has been exceeded, the control is set to a "lost" state at 128 and the inputs to microcomputer 48 are enabled according to a 50 percent duty cycle at 130 and the output of the microcomputer is disabled. The 50 percent duty cycle involves enabling the inputs for 213 msec and then disabling the inputs for 213 sec repeatedly which represents a 2.35 Hz repetition rate. This 50 percent duty cycle conserves power in the laser receiver, but allows a valid input to be received within, at most, approximately two cycles of the 2.35 Hz repetition rate. This allows the laser beacon to be reacquired in a rapid fashion while conserving power in the laser receiver.

By utilizing a series of tests of the validity of a received radiation pulse, a laser receiver which is digitally filtered according to the invention is exceptionally reliable. However, acquisition of a valid laser is easily achieved. The present invention not only eliminates false readings from spurious light sources, as may occur by the reflection of a valid laser pulse from a shiny surface, but also eliminates false triggering from sources which, prior to the invention, have eluded filtering. For example, by recognizing the difference between a valid pattern of sensor radiation impingement and an invalid pattern of sensor radiation impingement, the invention is capable of avoiding actuation by a strobe light, mechanical shock, EMI, sunlight modulated by the atmosphere, and other non-laser radiation sources. This is accomplished in a manner which, furthermore, allows correction of particular patterns which, although they do not correspond to a normal sensing of radiation lasers, are recognized as being a statistically likely valid reception of laser radiation. Under such circumstances, an effort is made to correct the "invalid" pattern rather than discarding the input. Furthermore, the invention is capable of avoiding errors created by sources other than false light sources. Such sources include mechanical shock which causes the photosensors to respond as if contacted by light and random, spurious actuation of the sensors. This is accomplished by blanking the microcomputer and/or the photoreceptors themselves, in between the expected period of receipt of the next valid laser pulse. Additionally, by requiring a reception of a given number of valid inputs prior to beginning the production of control outputs, the invention may reliably ignore a spurious input received while the microcomputer is receptive to receiving an input.

Changes and modifications in the specifically described embodiments can be carried out without departing from the principles of the invention, which is intended to be limited only by the scope of the appended claims, as interpreted according to the principles of patent law including the doctrine of equivalents.

The embodiments of the invention in which an exclusive property or privilege is claimed are defined as follows:

1. A digitally filtered laser receiver, comprising:
    a plurality of radiation sensors which are spatially arranged in a manner which identifies a relative position of said sensors with respect to rotating laser radiation source as a function of which of said radiation sensors are impinged by radiation from said rotating laser radiation source; and
    a microcomputer having inputs that are responsive to impingement of said radiation sensors by radiation, said microcomputer programmed to process data from said inputs in a manner which produces output data only when at least one of said radiation sensors is impinged by radiation from said rotating laser radiation source, said output data indicative of a relative position of said radiation sensors and said rotating laser radiation source wherein said microcomputer is programmed to identify an invalid combination of said sensors being impinged by radiation and to inhibit production of output data in response to an invalid combination of said sensors being impinged by radiation.

2. The digitally filtered laser receiver of claim 1 wherein said microcomputer processes said data from said inputs by performing a series of tests of the validity of the impingement of said radiation sensors by radiation.

3. The digitally filtered laser receiver in claim 1 wherein said radiation sensors are spatially arranged in a line and wherein said invalid combination is outer ones of said radiation sensors being impinged by radiation.

4. The digitally filtered laser receiver in claim 1 wherein said microcomputer is programmed to produce said output as a function of which of said sensors are impinged by the radiation from said rotating laser radiation source and the sequence that the sensors are impinged wherein said output indicates which sensor lies centermost in the rotating radiation laser source.

5. The digitally filtered laser receiver in claim 1 wherein said microcomputer is programmed to attempt to correct an invalid combination of said sensors being impinged by radiation.

6. The digitally filtered laser receiver in claim 1 wherein said microcomputer is programmed to inhibit said output until after a number of impingements of at least one of said sensors by radiation have occurred.

7. The digitally filtered laser receiver in claim 6 wherein said microcomputer is programmed to respond to a subsequent impingement of at least one of said sensors by radiation only if the subsequent impingement occurs within a predetermined time period from a previous impingement of at least one of said sensors by a radiation source.

8. The digitally filtered laser receiver in claim 7 wherein said microcomputer disables said inputs for a period of time after at least one of said sensors is impinged by radiation and enables said inputs after said period of time.

9. The digitally filtered laser receiver in claim 8 wherein said microcomputer occasionally omits disabling of said inputs in order to measure the repetition rate of the radiation from said rotating laser radiation source impinging the sensors in order to determine said period of time that the inputs should be disabled.

10. The digitally filtered laser receiver in claim 1 wherein said microcomputer is programmed to disable said inputs for a predetermined period of time after at least one of said sensors is impinged by radiation.

11. The digitally filtered laser receiver in claim 10 wherein said microcomputer occasionally omits disabling of said inputs in order to measure the repetition rate of the radiation from said rotating laser radiation source impinging the sensors in order to determine said period of time that the inputs should be disabled.

12. The digitally filtered laser receiver in claim 1 wherein said microcomputer is programmed to respond to a subsequent impingement of at least one of said sensors by radiation only if the subsequent impingement occurs within a predetermined time period from a previous impingement of at least one of said sensors by radiation source.

13. The digitally filtered laser receiver in claim 12 wherein said microcomputer disables said inputs for a period of time after at least one of said sensors is impinged by radiation and enables said inputs after said period of time.

14. The digitally filtered laser receiver in claim 13 wherein said microcomputer occasionally omits disabling of said inputs in order to measure the repetition rate of the radiation from said rotating laser radiation source impinging the sensors in order to determine said period of time that the inputs should be disabled.

15. A digitally filtered laser receiver, comprising:
    a plurality of radiation sensors; and
    a microcomputer having inputs that are responsive to impingement of said radiation sensors by a source of radiation, said microcomputer producing an output indicative of a relative position of said sensors and radiation source; and
    said microcomputer programmed to respond only to particular combinations of said sensors being impinged by a source of radiation as a valid impingement and only after a particular number of repetitions of valid impingements to produce said output data.

16. The digitally filtered laser receiver in claim 15 wherein said radiation sensors are spatially arranged in a line and wherein said invalid combination is outer ones of said radiation sensors being impinged by radiation source.

17. The digitally filtered laser receiver in claim 15 wherein said microcomputer is programmed to inhibit producing output data in response to an invalid combination of said sensors being impinged by radiation source.

18. The digitally filtered laser receiver in claim 15 wherein said microcomputer is programmed to correct an invalid combination of said sensors being impinged by a radiation source.

19. The digitally filtered laser receiver in claim 15 wherein said microcomputer is programmed to produce said output as a function of which of said sensors are impinged by the radiation source and the sequence that the sensors are impinged wherein said output indicates which sensor lies centermost in the radiation source.

20. A digitally filtered laser receiver, comprising:

a plurality of radiation sensors; and a microcomputer having inputs that are responsive to impingement of said radiation sensors by a source of radiation, said microcomputer producing an output indicative of relative position of said sensors and a radiation source; and said microcomputer programmed to produce said output in response to impingement of said radiation sensors by a source of radiation only when sequential impingements by a source of radiation occur within a particular repetition rate range and only after a given number of impingements by radiation have been received.

21. The digitally filtered laser receiver in claim 20 wherein said microcomputer is programmed to identify an invalid combination of said sensors being impinged by radiation source and to respond to impingement of at least one of said sensors by radiation source only after a number of previous valid impingements of at least one of said sensors by radiation source have occurred.

22. The digitally filtered laser receiver in claim 20 wherein said microcomputer is programmed to identify an invalid combination of sensors being impinged by radiation source and to respond to said subsequent impingement only if a valid combination of said sensors is subsequently impinged.

23. The digitally filtered laser receiver in claim 20 wherein said microcomputer disables said inputs for a period of time after at least one of said sensors is impinged by a source of radiation and enables said inputs after said period of time.

24. The digitally filtered laser receiver in claim 23 wherein said microcomputer occasionally omits disabling of said inputs in order to measure the repetition rate of the laser source in order to determine said period of time that the inputs should be disabled.

25. The digitally filtered laser receiver in claim 20 wherein said microcomputer is programmed to produce said output as a function of which of said sensors are impinged by the radiation source and the sequence that the sensors are impinged wherein said output indicates which sensor lies centermost in the radiation source.

26. A digitally filtered laser receiver, comprising:

a plurality of radiation sensors; and a microcomputer having inputs that are responsive to impingement of said radiation sensors by a source of radiation, said microcomputer producing an output indicative of relative position of said sensors and radiation source; and said microcomputer programmed to respond to impingement of said radiation sensors by a radiation source only when sequential impingements occur at a repetition interval that is within a particular range, said microcomputer being inhibited from responding to another impingement of said radiation sensors for a portion of said repetition interval after responding to impingement of said radiation sensors.

27. The digitally filtered laser receiver in claim 26 wherein said microcomputer is programmed to identify an invalid combination of said sensors being impinged by a radiation source and to respond to impingement of at least one of said sensors by radiation source only after a number of previous valid impingements of at least one of said sensors by a radiation source have occurred.

28. The digitally filtered laser receiver in claim 26 wherein said microcomputer is programmed to produce said output as a function of which of said sensors are impinged by the radiation source and the sequence that the sensors are impinged wherein said output indicates which sensor lies centermost in the radiation source.

* * * * *

UNITED STATES PATENT AND TRADEMARK OFFICE
CERTIFICATE OF CORRECTION

PATENT NO. : 5,742,069

DATED : April 21, 1998

INVENTOR(S) : Timothy E. Steenwyk and Ross C. Stoepker

It is certified that error appears in the above-identified patent and that said Letters Patent is hereby corrected as shown below:

Column 1, line 4:
"The" should be --This--.

Column 2, lines 32 and 33:
"invention." should be --invention,--.

Column 2, line 35:
"advantages." should be --advantages,--.

Column 3, line 62:
"one-shot." should be --one-shot,--.

Column 4, line 39:
"accepted. It" should be --accepted, it--.

Column 4, line 60:
After "77" insert --whether--.

Column 7, claim 1, line 40:
After "to" insert --a--.

Column 8, claim 4, lines 4 and 5:
"in the rotating radiation laser source" should be
--in the rotating laser radiation source--.

UNITED STATES PATENT AND TRADEMARK OFFICE
CERTIFICATE OF CORRECTION

PATENT NO. : 5,742,069
DATED : April 21, 1998
INVENTOR(S) : Timothy E. Steenwyk and Ross C. Stoepker It is certified that error appears in the above-identified patent and that said Letters Patent is hereby corrected as shown below:

Column 8, claim 7, line 19:
"a radiation source" should be --radiation--.

Column 8, claim 12, line 45:
"radiation source" should be --radiation--.

Column 8, claim 15, line 62:
Before "radiation" insert --a--.

Column 9, claim 20, line 24:
Before "relative" insert --a--.

Column 9, claim 20, line 32:
After "by" insert --a source of--.

Column 9, claim 21, line 35:
Before "radiation" insert --a--.

Column 9, claim 21, line 36:
Before "radiation" insert --a--.

UNITED STATES PATENT AND TRADEMARK OFFICE
CERTIFICATE OF CORRECTION

PATENT NO. : 5,742,069
DATED : April 21, 1998
INVENTOR(S) : Timothy E. Steenwyk and Ross C. Stoepker It is certified that error appears in the above-identified patent and that said Letters Patent is hereby corrected as shown below:

Column 9, claim 21, line 38:
    Before "radiation" insert --a--.

Column 9, claim 22, line 42:
    Before "radiation" insert --a--.

Column 10, claim 26, line 21:
    Before "relative" insert --a--.

Column 10, claim 26, line 22:
    Before "radiation" insert --a--.

Column 10, claim 27, line 36:
    Before "radiation" insert --a--.

Signed and Sealed this

Twentieth Day of June, 2000

Attest:

Q. TODD DICKINSON

*Attesting Officer*  *Director of Patents and Trademarks*